(12) United States Patent
Tomiyoshi

(10) Patent No.: US 7,372,241 B1
(45) Date of Patent: *May 13, 2008

(54) APPARATUS AND METHOD FOR SWITCHING VOLTAGE REGULATION

(75) Inventor: Kenji Tomiyoshi, Chiba (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,529

(22) Filed: Aug. 25, 2006

Related U.S. Application Data

(63) Continuation-in-part of application No. 11/002,544, filed on Dec. 1, 2004, now Pat. No. 7,119,522, which is a continuation-in-part of application No. 10/835,616, filed on Apr. 29, 2004, now Pat. No. 7,045,993.

(51) Int. Cl.
    *G05F 1/56* (2006.01)
(52) U.S. Cl. .................. 323/288; 323/224; 323/271; 323/283
(58) Field of Classification Search ............ 323/224, 323/283, 288, 271
    See application file for complete search history.

(56) References Cited

U.S. PATENT DOCUMENTS

| | | |
|---|---|---|
| 5,428,267 A | 6/1995 | Peil |
| 6,166,528 A * | 12/2000 | Rossetti et al. ............. 323/283 |
| 6,246,220 B1 * | 6/2001 | Isham et al. ................ 323/224 |
| 6,285,174 B1 * | 9/2001 | Suzuki ........................ 323/288 |
| 6,377,032 B1 | 4/2002 | Andruzzi et al. |
| 6,381,159 B2 * | 4/2002 | Oknaian et al. .............. 363/98 |
| 6,396,252 B1 * | 5/2002 | Culpepper et al. .......... 323/285 |
| 6,476,589 B2 * | 11/2002 | Umminger et al. ......... 323/282 |
| 6,930,474 B2 * | 8/2005 | Wang .......................... 323/288 |
| RE38,940 E | 1/2006 | Isham et al. |
| 7,045,993 B1 | 5/2006 | Tomiyoshi |
| 7,180,274 B2 * | 2/2007 | Chen et al. .................. 323/222 |

OTHER PUBLICATIONS

U.S. Appl. No. 10/703,960, Broach et al.
U.S. Appl. No. 10/780,375, Broach et al.
U.S. Appl. No. 10/780,207, Broach et al.

(Continued)

*Primary Examiner*—Jeffrey Sterrett
*Assistant Examiner*—Stuart Hansen
(74) *Attorney, Agent, or Firm*—Darby and Darby PC; Matthew M. Gaffney

(57) ABSTRACT

A regulator is provided. The regulator includes a main switch, a synchronous switch, an inductor, a sample-and-hold circuit, a ramp generator, a PWM comparator, an error amplifier, and a current sense amplifier. A current through the synchronous switch is sensed by the current sense amplifier. Also, a current sense voltage provided by the current sense amplifier is sampled when the synchronous switch is on, and held when the synchronous switch is off. The ramp generator is arranged to generate a voltage ramp that emulates the slope of the inductor current while the synchronous switch is open. Additionally, the sampled synchronous switch current is combined with the voltage ramp. The PWM comparator is arranged to provide a PWM signal by comparing the voltage ramp to a comparison signal provided by the error amplifier.

22 Claims, 7 Drawing Sheets

OTHER PUBLICATIONS

U.S. Appl. No. 10/835,616, Tomiyoshi.
U.S. Appl. No. 10/861,872, Broach et al.
U.S. Appl. No. 10/985,477, Tomiyoshi.
U.S. Appl. No. 11/002,544, Tomiyoshi.
Linear Technology Data Sheet (1999) "LTC 1707—High Efficiency Monolithic Synchronous Step-Down Switching Regulator," pp. 1-16, Linear Technology Corporation, Milipitas, California.
Maxim Data Sheet (2001) "MAX 1684/MAX1685—Low-Noise, 14V Input, 1A, PWM Step-Down Converters," pp. 1-14, Maxim Integrated Products, Sunnyvale, California.
Robert W. Erickson and Dragan Maksimovic, Editors, *Fundamentals of Power Electronics*, pp. 439-487, 834-839, 2nd Edition, Kluwer Academic Publishing, Norwell, Massachusetts, 2001.
Abraham I. Pressman, *Switching Power Supply Design*, pp. 143-165, 2nd Edition, McGraw Hill, New York, New York, 1998.
Raymond B. Ridley, "A New Continuous Time Model fir Current-mode Control," *IEEE Transaction on Power Electronics*, vol. 6, No. 2, Apr. 1991, pp. 271-280.

* cited by examiner

APPARATUS AND METHOD FOR SWITCHING VOLTAGE REGULATION

RELATED APPLICATION

This application is a continuation-in-part of application Ser. No. 11/002,544, filed on Dec. 1, 2004, which is a continuation-in-part of application Ser. No. 10/835,616, filed on Apr. 29, 2004, issued as U.S. Pat. No. 7,045,993 on May 16, 2006, of which the benefit of the earliest filing date is hereby claimed under 35 U.S.C. § 120, and both of the earlier filed applications are hereby incorporated by reference.

FIELD OF THE INVENTION

The invention is related to voltage regulation, and in particular, to an apparatus and method for a switch voltage regulator circuit that samples a sensed current of the synchronous switch.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1A:
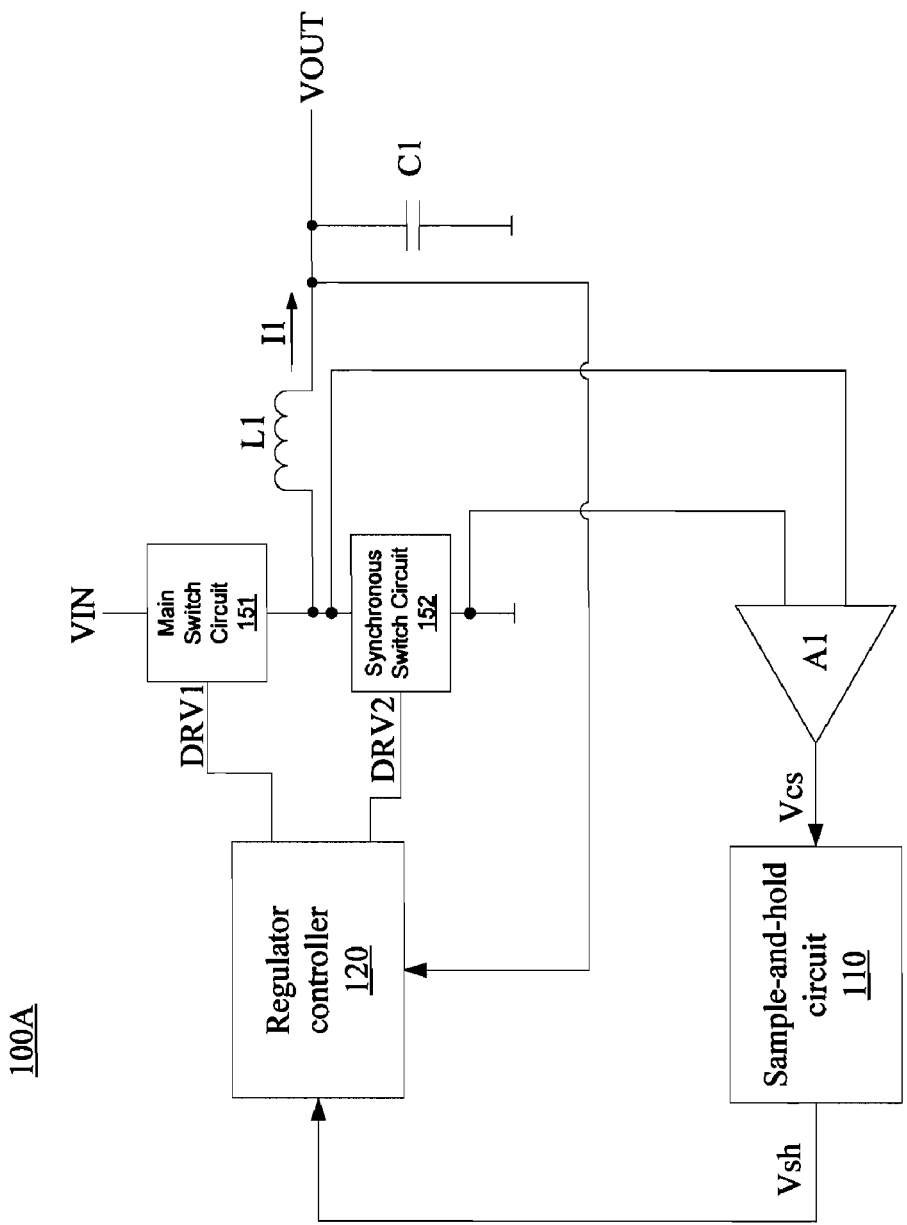
FIG. 1A illustrates a block diagram of an embodiment of a regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, the invention is related to a regulator. The regulator includes a main switch, a synchronous switch, an inductor, a sample-and-hold circuit, a ramp generator, a PWM comparator, an error amplifier, and a current sense amplifier. A current through the synchronous switch is sensed by the current sense amplifier. Also, a current sense voltage provided by the current sense amplifier is sampled when the synchronous switch is on, and held when the synchronous switch is off.

The ramp generator is arranged to generate a voltage ramp that emulates the slope of the inductor current while the synchronous switch is open. Additionally, the sampled synchronous switch current is combined with the voltage ramp. The PWM comparator is arranged to provide a PWM signal by comparing the voltage ramp to a comparison signal provided by the error amplifier.

FIG. 1A illustrates a block diagram of an embodiment of regulator circuit 100A. Regulator circuit 100A includes main switch circuit 151, synchronous switch circuit 152, inductor circuit L1, capacitor circuit C1, current-sense amplifier circuit A1, sample-and-hold circuit 110, and regulator controller 120.

Inductor circuit L1 is arranged to provide current I1. More specifically, in a buck regulator topology embodiment, inductor circuit L1 is arranged such that a voltage substantially given by Vin−Vout is across inductor L1 when switch circuit 151 is closed. Accordingly, in a buck regulator topology embodiment, dI1/dt is substantially given by (Vin−Vout)/L1 when switch circuit 151 is closed.

Also, capacitor circuit C1 is an output capacitor for regulator circuit 100A. Current-sense amplifier A1 is configured to sense a current across synchronous switch circuit 152 and provide current sense voltage Vcs in response to the sensed current. Additionally, sample-and-hold circuit 110 is configured to sample voltage Vcs when synchronous switch circuit 152 is closed, and further configured to hold voltage Vcs when synchronous switch circuit 152 is open. Regulator controller 120 is configured to provide signals DRV1 and DRV2 based in part on signals Vout and Vsh. Further, regulator controller 120 is configured to provide signal DRV2 as an inverse of signal DRV1. In various embodiment, regulator controller 120 may control any type of synchronously-rectified switching regulation, including buck regulation, boost regulation, buck-boost regulation, inverting regulation, or the like. Switch circuit 151 is configured to open and close responsive to signal DRV1, and synchronous switch circuit 152 is configured to open and close responsive to signal DRV2.

Figure 1B:
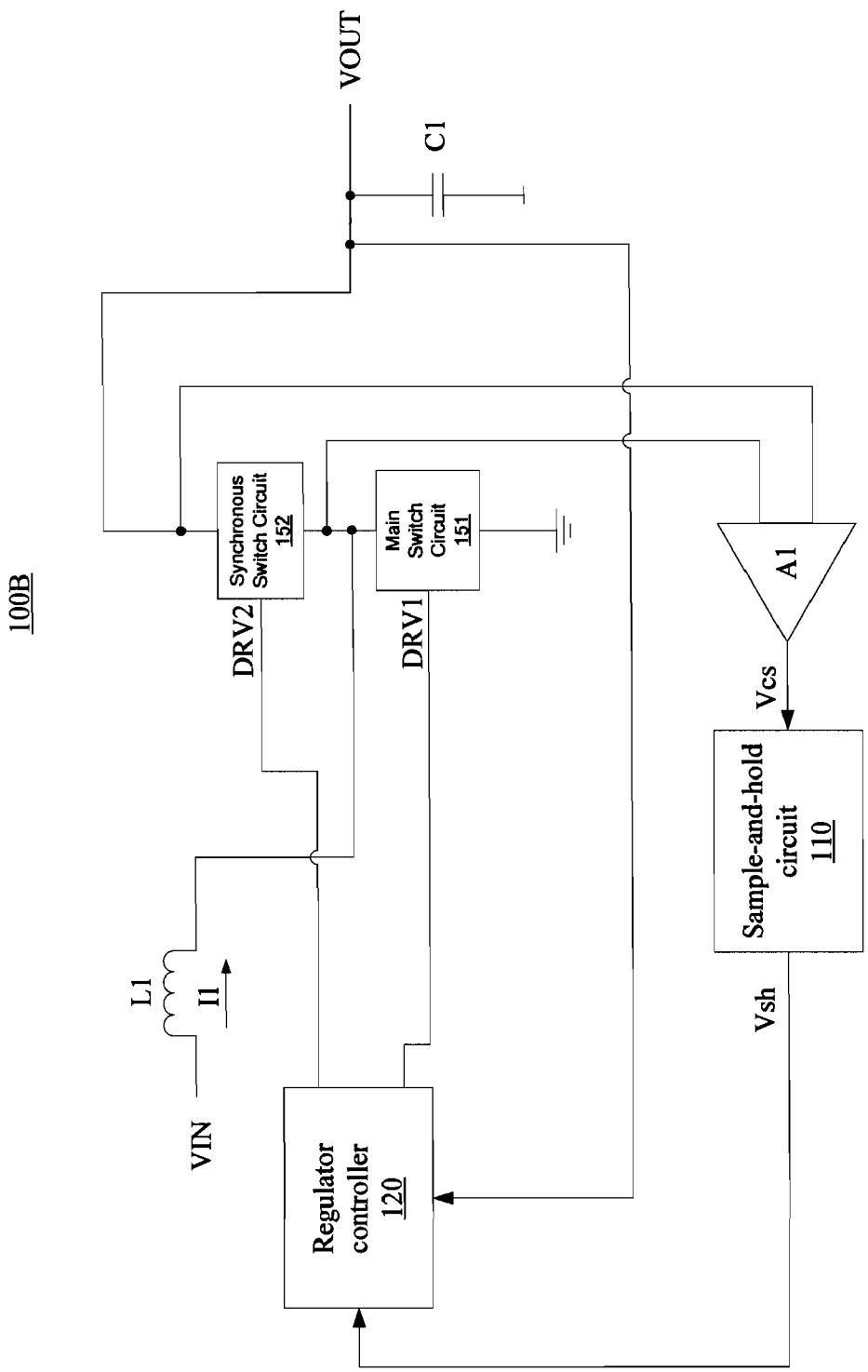
FIG. 1B illustrates a block diagram of an embodiment of the regulator circuit of FIG. 1A in which a boost topology is employed.

Although FIG. 1A illustrates a step-down (buck) switching regulator topology, the invention is not so limited. Embodiments of the invention may be used in virtually any topology of a synchronously-rectified switching regulator, including a boost topology, an inverting topology, a buck-boost topology, or the like. For example, FIG. 1B illustrates an embodiment of a regulator circuit 100AB, which is an embodiment of regulator circuit 100A in a boost topology. In regulator circuit 100A of FIG. 1A, the main switch is a top-side switch and the synchronous switch is a bottom-side switch. Conversely, in regulator circuit 100AB of FIG. 1B, the main switch is a bottom-side switch and the synchronous switch is a top-side switch.

Figure 2:
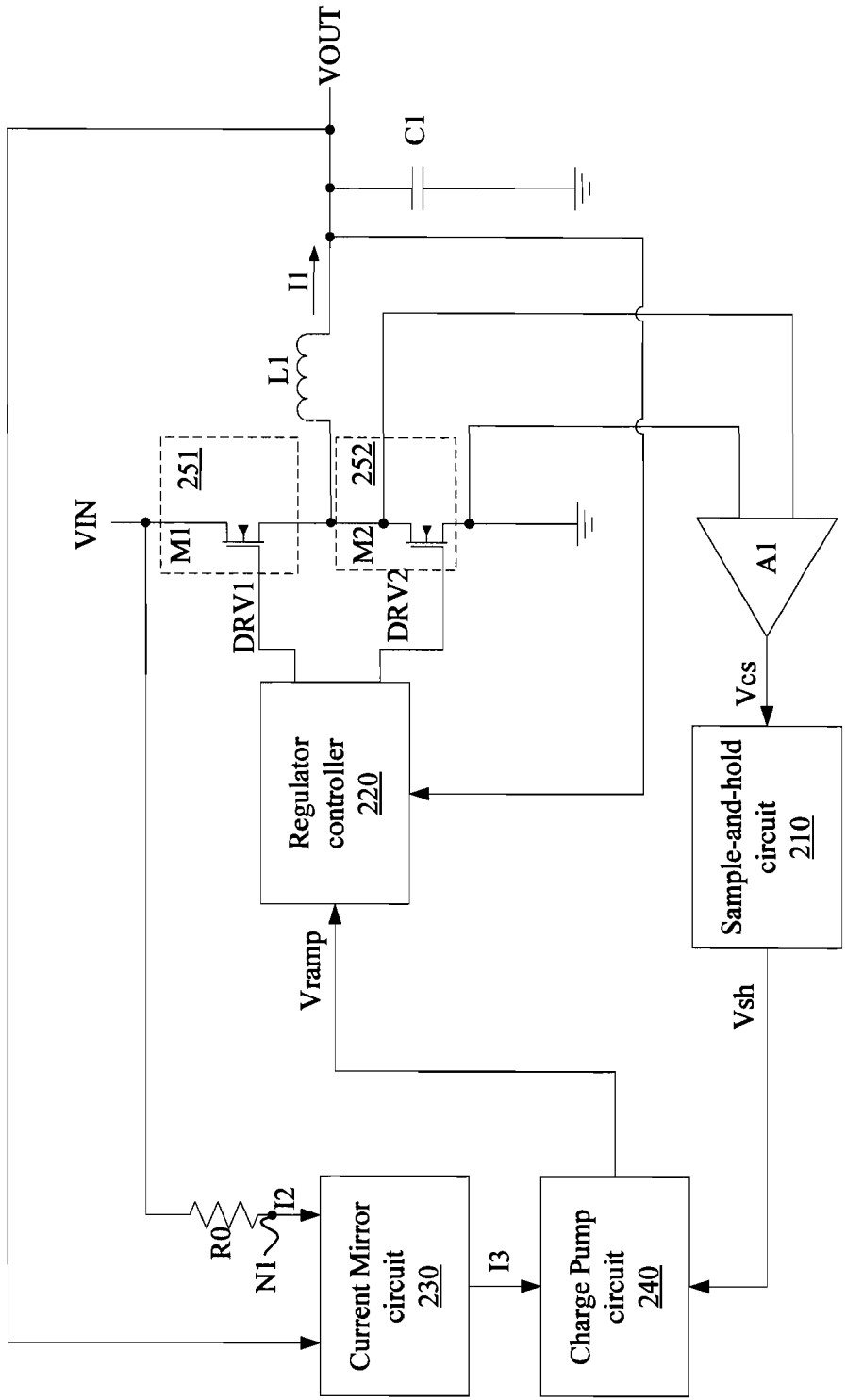
FIG. 2 shows a block diagram of an embodiment of the regulator circuit of FIG. 1 that includes a current source circuit for emulating the inductor current.

FIG. 2 shows a block diagram of an embodiment of regulator circuit 200 that includes a current source circuit for emulating the inductor current. Components in regulator circuit 200 may operate in a substantially similar manner to similarly named components in regulator circuit 100A, and may operate in a different manner in some ways. Regulator circuit 200 further includes current source circuit 230 and resistor R0. In regulator circuit 200, switch circuit 251 includes transistor M1, and synchronous switch circuit 252 includes transistor M2.

Resistor R0 is arranged to have a voltage of Vindc across, where Vindsc is substantially equal to the voltage across the inductor when switch circuit 251 is closed. In one embodiment, current source circuit 230 is configured to provide a voltage that is substantially equal output voltage Vout at node N1. Accordingly, resistor R0 has a voltage substantially equal to Vin−Vout across it. Resistor R0 is arranged to provide current I2, where current I2 is substantially given by Vindsc/R0. In the buck embodiment shown, Vindc is Vin−Vout. Also, current source circuit 230 is further configured to provide current I3 from current I2.

Additionally, ramp generator circuit 240 provides voltage Vramp from current I3 and voltage Vsh. By proper pre-selection of a resistance that is associated with resistor R0, the upslope associated with voltage Vramp is substantially similar to the upslope associated with current I1. Also, the voltage ramp is offset according to voltage Vsh. Accordingly, voltage Vramp substantially emulates current I1. Regulator controller 220 is arranged to provide signals DRV1 and DRV2, based in part on signals Vramp and Vout.

FIG. 2 illustrates an embodiment of a buck regulator embodiment. However, the invention is not so limited. The emulated current may be provided in a different way in different topologies. As discussed above, for a buck regulator topology, (VIN−Vout)/R0 may be used. For a boost regulator topology, (VIN−0V)/R0 may be used instead.

Figure 3:
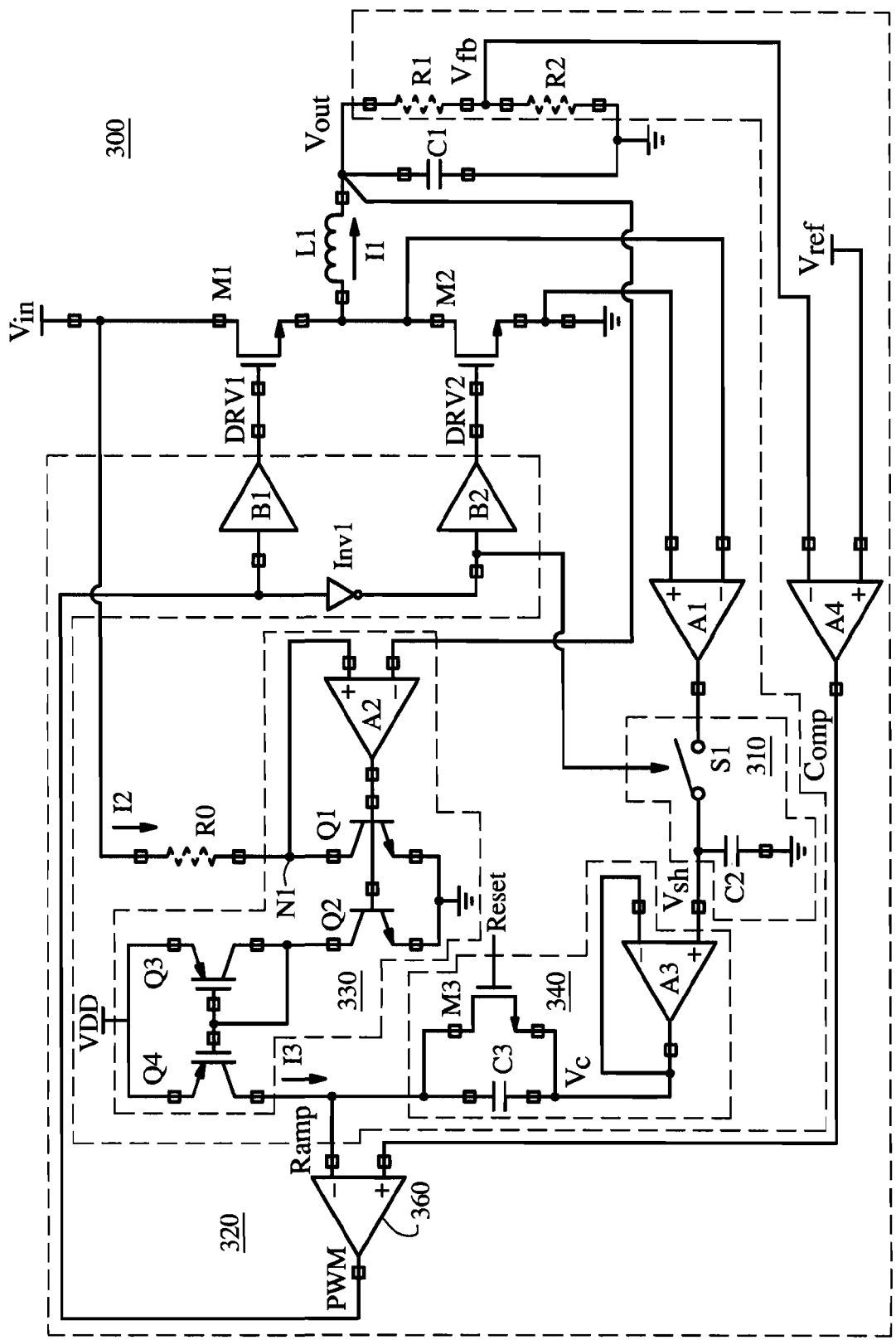
FIG. 3 schematically illustrates an embodiment of the regulator circuit of FIG. 2.

FIG. 3 schematically illustrates an embodiment of regulator circuit 300. Components in regulator circuit 300 may operate in a substantially similar manner to similarly named components in regulator circuit 300, and may operate in a different manner in some ways. Current source circuit 330 may include transistors Q1-Q4 and operational amplifier circuit A2. Sample-and-hold circuit 310 includes switch circuit S1 and capacitor circuit C2. Also, ramp generator circuit 340 may include capacitor circuit C3, transistor M3, and operational amplifier circuit A3. Regulator controller 320 may include resistors R1 and R2, error amplifier A4, PWM comparator circuit 360, Inverter Inv1, and drivers B1 and B2.

In operation, operational amplifier circuit A2 may adjust the base voltage of transistors Q1 and Q2 such that the voltage at node N1 is substantially equal to output voltage Vout. Transistors Q1 and Q2 may be arranged as a current source to mirror current I2 to the collector of transistor Q3. Similarly, transistors Q3 and Q4 may be arranged as another current source that is configured to mirror the collector current of transistor Q3 to provide current I3.

Also, transistor M3 is arranged as a switch that is responsive to signal Reset. Amplifier circuit A3 may be arranged as a follower, such that sensed signal Vc is substantially equal to voltage Vsh. When signal Reset is low, signal Ramp begin linearly increasing from signal Vc. In this way, signal Vc is combined with signal Ramp. Signal Ramp continues to linearly increase until signal Reset changes to high. When signal Reset changes to high, capacitor C3 discharges, and signal Ramp returns to voltage Vc.

Further, the upslope associated with signal Ramp is substantially given by dV/dt=(Vin−Vout)/(R0*C3). Accordingly, by properly pre-selecting the resistance of resistor R0, the upslope of the voltage ramp is substantially similar to the upslope of inductor current I1.

Additionally, in one embodiment, if Vin is substantially greater than Vout, the value of Vout can be ignored, e.g., where Vin is relatively equivalent to 10 volts and Vout is relatively equivalent to 1 volt. In this embodiment, the upslope associated with signal Ramp can be represented by dV/dt=Vin/(R0*C3).

Also, resistors R1 and R2 may be arranged as a voltage divider that is configured to provide voltage Vfb from voltage Vout. Error amplifier A4 may be configured to provide signal Comp from signals Vfb and Vref. PWM comparator circuit 360 is configured to provide signal PWM from in response to a comparison of signals Comp and Ramp. Driver B1 may be configured to provide signal DRV1 from signal PWM. Also, inverter circuit Inv1 may be arranged to invert signal DRV1. Driver B2 may be arranged to buffer the output signal of inverter circuit Inv1 to provide signal DRV2.

Although a particular arrangement regulator circuit 300 is illustrated in FIG. 3, other embodiments may include other arrangements of circuit 300. For example, drivers B1 and B2 and operational amplifier A3 are optional circuit components that need not be included in regulator circuit 300. Additionally, current source circuit 330 may be arranged in a different manner than shown in FIG. 3. Also, although operational amplifier A2 is employed to provide a voltage that is substantially equal to Vout at node N1, operational amplifier A2 may be replaced with a different circuit that is arranged to provide a voltage that is substantially equal to Vout at node N1. Although FIG. 3 illustrates an embodiment in Inverter Inv1 is employed to provide signal DRV2 as an inverse of signal DRV1, in other embodiments, other arrangements may be employed to provide signal DRV2 as an inverse of signal DRV1.

Figure 4:
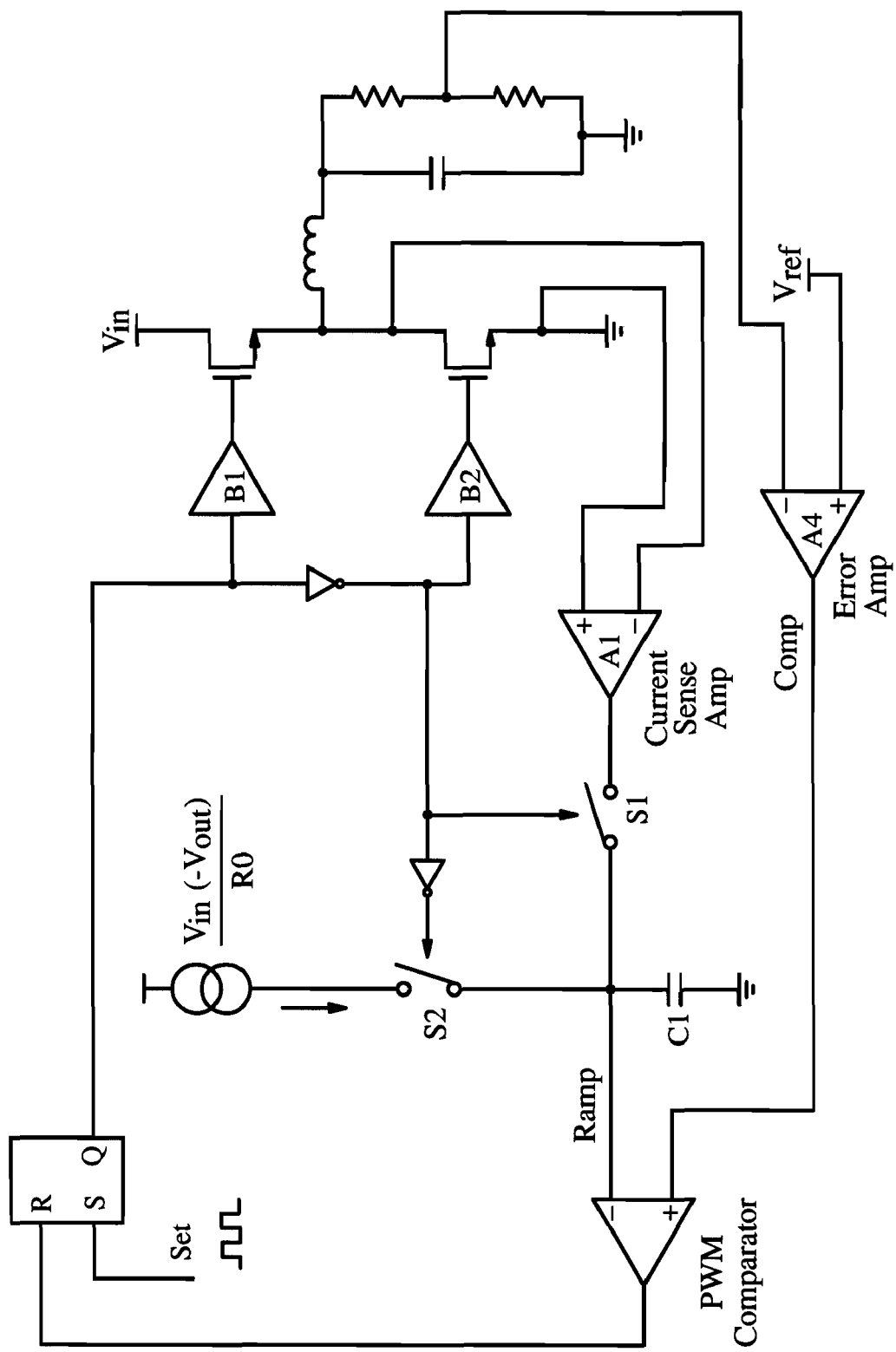
FIG. 4 schematically illustrates another embodiment of the regulator circuit.

FIG. 4 illustrates another embodiment of the invention where the operation of a ramp generator capacitive element and a sample and hold capacitive element are combined in one capacitive element C1. In this embodiment, if S1 is closed, the combined capacitor operates as the sample and hold capacitor discussed above. Similarly, if S2 is closed, the combined capacitor operates as the ramp generator capacitor discussed above. Further, when the synchronous switch is on, S1 is on and S2 is off.

Each of the resistor circuits described may consist of a single resistor only, or may include a plurality of resistors that are coupled in series or in parallel, and the like. Similarly, each of the capacitor circuits describe may consist of a single capacitor only, or may include a plurality of capacitors that are coupled in series or in parallel, and the like. These and other embodiments are within the spirit and scope of the invention.

Figure 5:
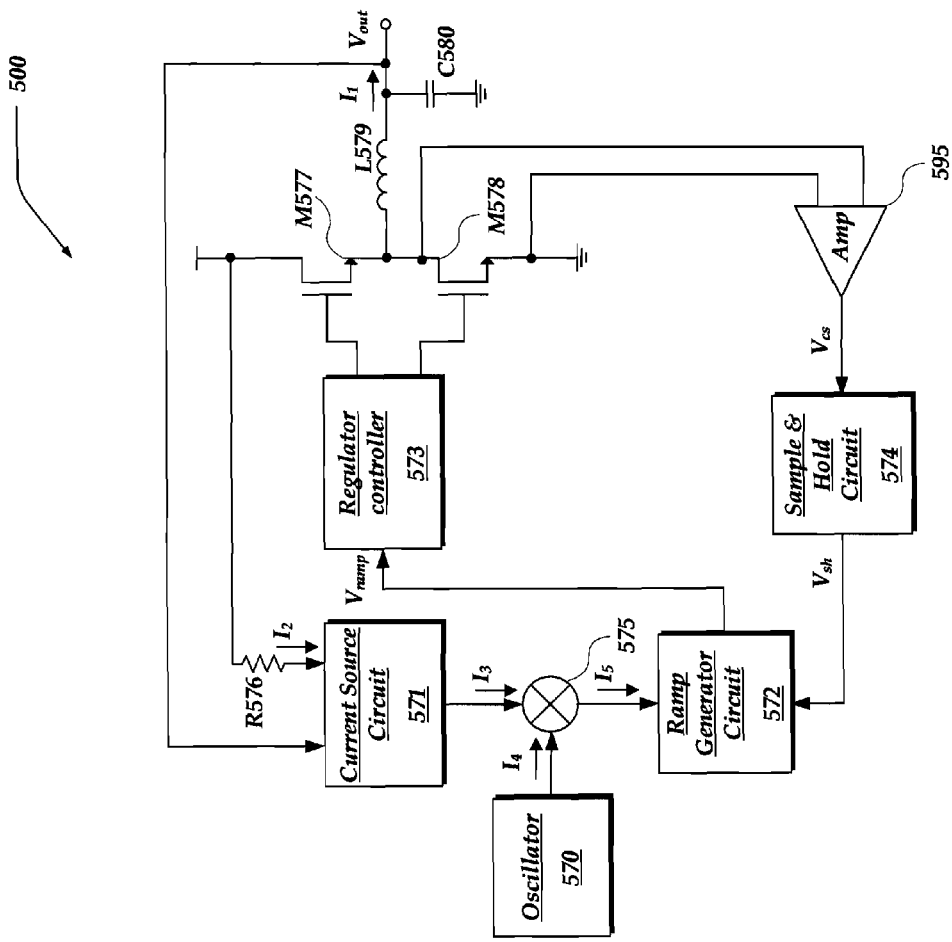
FIG. 5 illustrates another embodiment of a regulator circuit arranged in accordance with aspects of the present invention.

FIG. 5 illustrates an embodiment of regulator circuit 500 arranged in accordance with aspects of the present invention. Regulator circuit 500 includes switch circuit M577, synchronous switch circuit M578, inductor circuit L579, capacitor circuit C580, resistor circuit R576, current-sense amplifier circuit 595, sample-and-hold circuit 574, oscillator 570, current source circuit 571, ramp generator circuit 572, current multiplier 575, and regulator controller 573.

Inductor circuit L579 is arranged to provide current I1. More specifically, inductor circuit L579 is arranged such that a voltage substantially given by Vin−Vout is across inductor L579 when switch circuit M577 is closed. Accordingly, dI1/dt is substantially given by (Vin−Vout)/L579 when switch circuit M577 is closed.

Also, capacitor circuit C580 is configured to provide output voltage Vout based on current I1. Current-sense amplifier 595 is configured to sense a current across synchronous switch circuit M578 and provide current sense voltage Vcs in response to the sensed current. Additionally, sample-and-hold circuit 574 is configured to sample voltage Vcs when synchronous switch circuit M578 is closed, and further configured to hold voltage Vcs when synchronous switch circuit M578 is open. Regulator controller 573 is configured to provide a first signal and a second signal to switch circuits M577 and M578 based in part on Vramp. Further, regulator controller 573 is configured to provide the second signal as an inverse of the first signal. Switch circuit M577 is configured to open and close responsive to the first signal, and synchronous switch circuit M578 is configured to open and close responsive to the second signal.

Regulator controller 573 is arranged to be controlled by Vramp generated by ramp generator circuit 572. Ramp generator circuit 572 is arranged to receive current I5 from current multiplier 575 and voltage Vsh from sample and hold circuit 573. Current multiplier 575 is arranged to determine I5 based on currents I4 from oscillator 570 and I3 from current source circuit 571 such that I5=(I3*I4)/I1, where I1 is reference current and 12 uA in this case. Current source circuit 571 is arranged to receive Vout and I2, where I2=(Vin−Vout)/R2. Current source circuit 571 is further arranged to provide I3 such that I3=(Vin−Vout)/R, where the R is 2 Mohm. Moreover, I4 is determined by oscillator 570 such that I4=fosc*K, where K is $6*10^{-12}$, and fosc is a frequency of the oscillator. I1, R, and K may be different value depending upon current mirror ratio in analog multiplier circuit 575 and current source circuit 571, or a capacitor value in the ramp generator circuit 572.

By employing current source circuit 571 and oscillator 570 to determine I5, which is used to determine Vramp, a frequency and a magnitude of Vramp may be modified without using an external resistor. In one embodiment, oscillator 570 may comprise a current controlled oscillator enabling a user to modify Vramp by changing a value of a current provided to oscillator 570.

Figure 6:
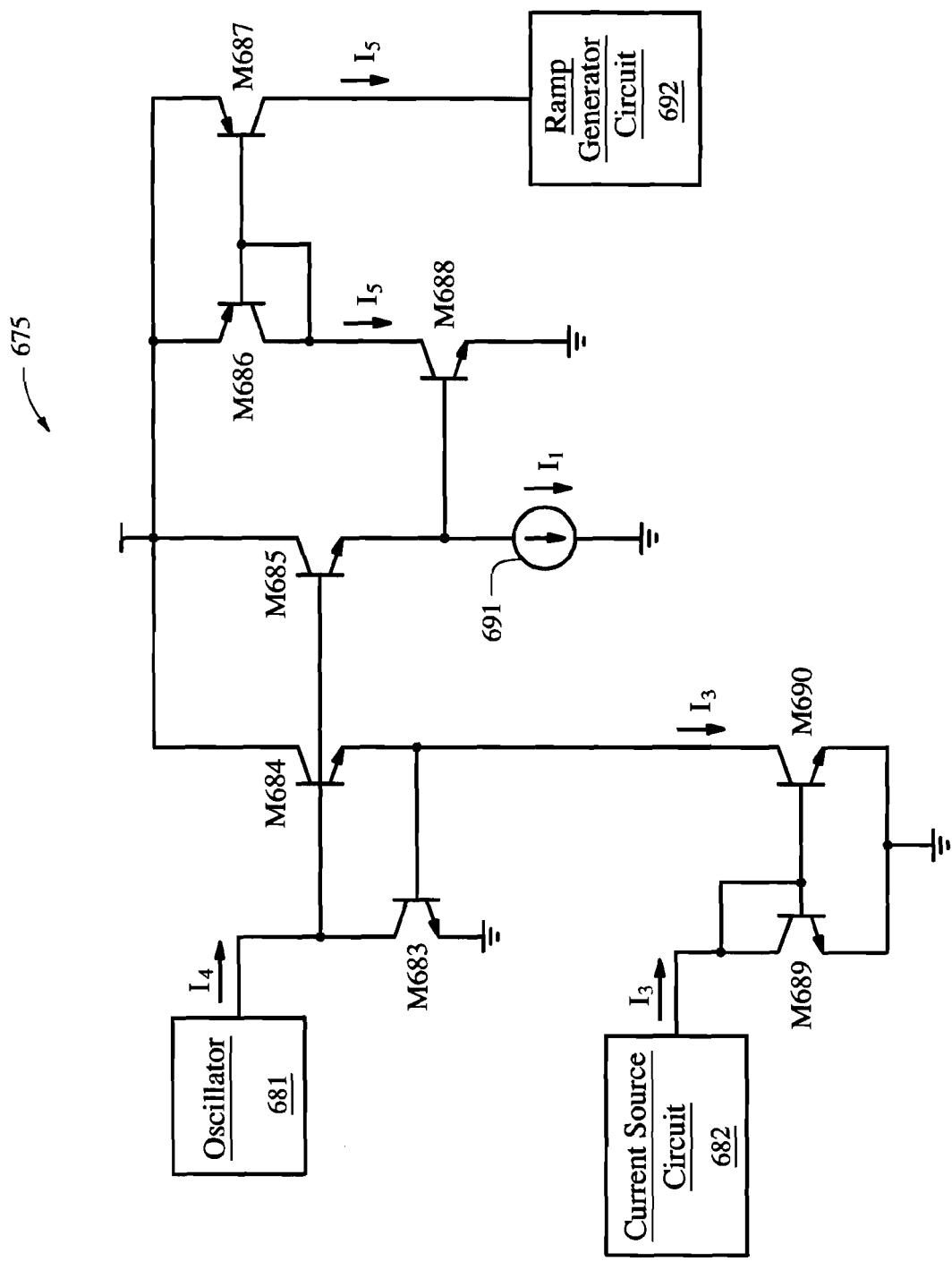
FIG. 6 schematically illustrates an embodiment of an analog current multiplier of the regulator circuit of FIG. 5 along with an oscillator, a current source circuit, and a ramp generator circuit.

FIG. 6 schematically illustrates an embodiment of analog current multiplier 675 along with oscillator 681, current source circuit 682, and ramp generator circuit 692. Analog current multiplier 675 is one embodiment current multiplier 575 of the regulator circuit of FIG. 5. Analog current multiplier 675 includes transistors M683-M690 and current source 691.

Transistors M689 and M690 are arranged to operate as a current mirror providing I3 from current source circuit 682 to an emitter terminal of M684. I3 may be expressed as I3=(Vin−Vou)/R, where R is 2 Mohm, as described in conjunction with FIG. 5 above. M684 and M685 are cascaded with their collector terminals coupled to a supply voltage and the base terminals driven by I4 provided by oscillator 681, where I4=fosc*K, where K is $6*10^{-12}$, as described above. Current source 691 is coupled to an emitter terminal of M685 and is arranged to provide I1 with a value of about 12 μA.

A collector terminal of transistor M688 is also coupled to the base-collector terminal of diode connected transistor M686 such that current I5 flows through a collector terminal of M688. I5 may expressed as I5=(I3*I4)/I1. A relationship between base-emitter voltages of transistors M683, M684, M685, and M688 may be expressed as:

$V_{BE(688)}=V_{BE(683)}+V_{BE(684)}-V_{BE(685)}$, where $V_{BE(683)}=V_T*\ln(I4/Is)$, $V_{BE(684)}=V_T*\ln(I3/Is)$, and $V_{BE(685)}=V_T*\ln(I1/Is)$.

where Is is the saturation current, and $V_T$ is the thermal voltage kT/q.

From the above base-emitter voltages, $V_{BE(688)}$ may be expressed as:

$V_{BE(688)}=V_T*\ln(I3*I4)/(I1*Is)=Vt*\ln(I5/Is)$. Assuming I1 is about 12 μA as mentioned previously, I5 may be expressed as $$I5 = I3 * \frac{I4}{12*10^{-6}}.$$

Transistors M686 and M687 are arranged to operate as a current mirror providing I5 to ramp generator circuit 692.

While analog current multiplier is shown employing BJT transistors and references to BJT technology are made throughout the specification and claims, other circuit technique such as Gilbert type analog multiplier may also be implemented without departing from the scope or spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for synchronously-rectified switching regulation, comprising:
    a regulator controller that is arranged to provide a first switch control signal to a first switch, and to provide a second switch control signal to a synchronous switch, such that the first and second switch control signals are based in part on a capacitor voltage and an output voltage, and such that the regulator controller is operable to control a synchronous switching voltage regulation to convert an input voltage into the output voltage;
    a current sense circuit that is operable to sense a current across the synchronous switch, and to provide a current sense voltage at a current sense node based on the sensed current;
    another switch that is coupled between the current sense node and a capacitor node, wherein said another switch is operable to close if the synchronous switch is closed, and to open if the synchronous switch is open; and
    a capacitor that is coupled to the capacitor node, wherein the capacitor voltage is provided by the capacitor at the capacitor node.

2. The circuit of claim 1, wherein the regulator controller is arranged to control the regulation to perform boost voltage regulation such that the output voltage is regulated such that the regulated output voltage is greater than the input voltage.

3. The circuit of claim 1, wherein the regulator controller is arranged to control the regulation to perform at least one of buck regulation, boost regulation, buck/boost regulation, or inverting regulation.

4. The circuit of claim 1, further comprising a resistor, a current source circuit, and a ramp generator circuit, wherein the ramp generator circuit is configured to provide a voltage ramp signal, and wherein the resistor, current source circuit, and ramp generator circuit are arranged such that: while the synchronous switch is open and the first switch is closed, the voltage ramp signal has a slope that is substantially similar to a slope that is associated with another slope that is associated with an inductor current.

5. The circuit of claim 4, wherein the resistor is arranged such that a voltage across the resistor is substantially equal to a voltage across an inductor while the switch is closed.

6. The circuit of claim 1, further comprising:
a current source circuit that is arranged to provide a current that is proportional to a difference between a voltage across an inductor while the switch is closed; and
a ramp voltage switch that is coupled between the current source circuit and the capacitor node, wherein the ramp voltage switch is operable to open if the synchronous switch is closed, and to close if the synchronous switch is open.

7. The circuit of claim 6, wherein the current source circuit includes:
an op amp having at least a first input, a second input, and an output, wherein the first input of the op amp is arranged to receive the output voltage;
a first current mirror having an input, an output, and a control input, wherein the input of the first current mirror is coupled to the second input of the first op amp, and wherein the control input of the first current mirror is coupled to the output of the first op amp;
a resistor that is coupled between the input voltage and the second input of the first op amp, such that, during operation, the voltage across the resistor is proportional to the difference between the input voltage and the output voltage; and
a second current mirror having an input and an output, wherein the input of the second current mirror is coupled to the output of the first current mirror, and wherein the output of the second current mirror is coupled to the ramp voltage switch.

8. The circuit of claim 1, further comprising:
a resistor that is arranged such that a voltage across the resistor is substantially equal to a voltage across an inductor while the switch is closed, and further arranged to provide a resistor current from the voltage across the resistor.

9. The circuit of claim 8, further comprising:
a current source that is arranged to provide another current that is substantially proportional to the resistor current.

10. The circuit of claim 9, wherein the current source circuit includes:
a circuit that is arranged to provide yet another current that is proportional to the resistor current; and
a current mirror that is arranged to mirror said yet another current to provide said another current to the ramp generator.

11. The circuit of claim 10,
wherein the current source circuit further includes:
an op amp that is coupled to the resistor at a first node, wherein the resistor is coupled between the input node and the first node, and wherein the op amp is arranged to adjust a control voltage that is associated with the first current source such that a voltage that is associated with the first node is approximately equal to the output voltage.

12. The circuit of claim 9, wherein the ramp generator current is arranged to provide a voltage ramp signal based on the ramp generator current and a sensed signal that is based on the capacitor voltage.

13. The circuit of claim 12, wherein the ramp generator circuit is further arranged to be responsive to a reset signal such that the ramp signal changes to a voltage that is associated with the sensed signal when the reset signal corresponds to a first level, and such that the ramp signal substantially linearly changes when the reset signal corresponds to a second level such that the linear change is substantially similar to a linear increase that is associated with the inductor current.

14. The circuit of claim 12, wherein the ramp generator circuit includes:
a ramp generator capacitor circuit that is coupled between a second node and a third node, wherein the capacitor circuit is arranged to receive the ramp generator current at the second node, and further arranged to receive the sensed signal at the third node; and
a switch circuit that is arranged to discharge the ramp generator capacitor circuit if a reset signal is asserted.

15. The circuit of claim 12, wherein the ramp generator circuit includes:
a ramp generator capacitor circuit that is coupled between a second node and a third node, wherein the capacitor circuit is arranged to receive the ramp generator current at the second node, and further arranged to receive the sensed signal at the third node; and
a switch circuit that is coupled to the ramp generator capacitor circuit, wherein the switch circuit is arranged to open and close responsive to a reset signal.

16. The circuit of claim 1, further comprising:
an analog multiplier that is arranged to provide a control current; and
a ramp generator circuit that is arranged to provide a ramp voltage based, in part, on the control current, wherein the regulator controller is further operable to provide the first and second switch control signals such that the first and second switch control signals are further based on the ramp voltage.

17. The circuit of claim 16, further comprising:
an oscillator circuit that is arranged to provide an oscillator current; and
a current source circuit that is arranged to receive the output voltage and a predetermined portion of the input voltage, and to provide a source current based in part on the output voltage and the predetermined portion of the input voltage.

18. The circuit of claim 17, wherein the analog current multiplier is further arranged to determine the control current based in part on the oscillator current and the source current.

19. The circuit of claim 17, wherein the oscillator circuit is further arranged to provide a frequency fosc, and wherein the oscillator current is determined based on fosc.

20. The circuit of claim 18, wherein the analog current multiplier is further arranged to provide the control current based on the source current, the oscillator current, and a reference current such that the control current is about equal to $I3*I4/Iref$, where Iref represents the reference current, I3 represents the source current, and I4 represents the oscillator current.

21. The circuit of claim 18, wherein the analog current multiplier includes:
- a first current mirror circuit that is arranged to provide the source current from the current source circuit;
- a current source that is arranged to provide a first current with a first value;
- a pair of transistors that are coupled in parallel to each other such, and are arranged to combine the source current, the oscillator current, and the first current, and to provide the control current such that the control current is about equal to a product of the source current and the oscillator current divided by the first value; and
- a second current mirror circuit that is arranged to provide the control current to the ramp generator circuit.

22. A circuit for switching regulation, comprising:
- a regulator controller that is arranged to provide a first switch control signal to a first switch, and to provide a second switch control signal to a synchronous switch, such that the first and second switch control signals are based in part on a sample-and-hold signal and an output voltage, and such that the regulator controller is operable to control a synchronous switching voltage regulation to convert an input voltage into the output voltage;
- a current sense circuit that is operable to sense a current across the synchronous switch, and to provide a current sense voltage at a current sense node based on the sensed current; and
- a sample-and-hold circuit that is arranged to sample the current sense voltage if the synchronous switch is closed, wherein the sample-and-hold circuit is arranged to provide the sample-and-hold signal at a capacitor node, and wherein the sample-and-hold circuit includes:
  - another switch that is coupled between the current sense node and the capacitor node, wherein said another switch is operable to close if the synchronous switch is closed, and to open if the synchronous switch is open.

* * * * *

UNITED STATES PATENT AND TRADEMARK OFFICE
CERTIFICATE OF CORRECTION

PATENT NO. : 7,372,241 B1  Page 1 of 1
APPLICATION NO. : 11/467529
DATED : May 13, 2008
INVENTOR(S) : Kenji Tomiyoshi It is certified that error appears in the above-identified patent and that said Letters Patent is hereby corrected as shown below:

On the Title Page,
On Page 2, in field (56), under "Other Publications", in column 2, line 6, delete "fir" and insert -- for --, therefor.

On Sheet 5 of 7, in Fig. 4, line 3, after "Set" delete "$V_{in}$ (-$V_{out}$)" and insert -- ($V_{in}$-$V_{out}$) --, therefor.

In column 5, line 30, delete "12 uA" and insert -- 12 μA --, therefor.

In column 5, line 57, delete "Vou)/R," and insert -- Vout)/R, --, therefor.

In column 6, line 7, delete "/Is)." and insert -- /Is), --, therefor.

In column 6, line 13, delete "Vt*In(I5/Is)." and insert -- $V_T$In(I5/Is). --, therefor.

In column 9, line 8, delete "such".

Signed and Sealed this

Second Day of December, 2008

JON W. DUDAS
*Director of the United States Patent and Trademark Office*